United States Patent
Medford (10) Patent No.: US 10,650,319 B2
(45) Date of Patent: May 12, 2020

(54) FLUX CONTROL OF QUBIT UNDER RESONANT EXCITATION

(71) Applicant: James Redding Medford, Baltimore, MD (US)

(72) Inventor: James Redding Medford, Baltimore, MD (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 1046 days.

(21) Appl. No.: 14/616,473

(22) Filed: Feb. 6, 2015

(65) Prior Publication Data

US 2016/0233965 A1    Aug. 11, 2016

(51) Int. Cl.
*G06N 10/00* (2019.01)
*H04B 10/90* (2013.01)

(52) U.S. Cl.
CPC ............. *G06N 10/00* (2019.01); *H04B 10/90* (2013.01)

(58) Field of Classification Search
CPC ......... G06Q 50/01; G06F 17/35; G06F 15/82; G06N 99/002
See application file for complete search history.

(56) References Cited

U.S. PATENT DOCUMENTS

| | | | |
|---|---|---|---|
| 4,360,898 A | 11/1982 | Faris | |
| 5,250,859 A | 10/1993 | Kaplinsky | |
| 5,323,344 A | 6/1994 | Katayama et al. | |
| 6,104,764 A * | 8/2000 | Ohta | H03D 3/009 329/306 |
| 7,498,832 B2 | 3/2009 | Baumgardner et al. | |
| 7,714,605 B2 | 5/2010 | Baumgardner et al. | |
| 7,772,871 B2 | 8/2010 | Herr et al. | |
| 7,772,872 B2 | 8/2010 | Lewis | |
| 7,782,077 B2 | 8/2010 | Herr et al. | |
| 7,786,748 B1 | 8/2010 | Herr | |
| 7,786,786 B2 | 8/2010 | Kirichenko | |
| 7,893,708 B2 | 2/2011 | Baumgardner et al. | |
| 7,969,178 B2 | 6/2011 | Przybysz et al. | |

(Continued)

FOREIGN PATENT DOCUMENTS

| | | |
|---|---|---|
| CN | 101626233 A | 1/2010 |
| CN | 101626234 A | 1/2010 |

(Continued)

OTHER PUBLICATIONS

The formula for the dot product in terms of vector components https://mathinsight.org/dot_product_formula_components (Year: NA).*

(Continued)

*Primary Examiner* — Feifei Yeung Lopez
(74) *Attorney, Agent, or Firm* — Tarolli, Sundheim, Covell & Tummino LLP (57) ABSTRACT

Systems and methods are provided for flux control of a qubit. A quantum system includes a microwave transmitter configured to provide a continuous microwave tone, and a qubit configured such that a portion of an energy spectrum of the qubit is responsive to an applied flux. The qubit also has an inductive element responsive to the continuous microwave tone to produce a Rabi oscillation within the qubit. A flux source is configured to apply a flux to the qubit.

8 Claims, 3 Drawing Sheets

(56) References Cited

U.S. PATENT DOCUMENTS

| | | |
|---|---|---|
| 7,975,195 B1 | 7/2011 | Joshi et al. |
| 7,975,795 B2 | 7/2011 | Asano |
| 8,111,083 B1 | 2/2012 | Pesetski et al. |
| 8,138,784 B2 | 3/2012 | Przybysz et al. |
| 8,242,799 B2 | 8/2012 | Pesetski et al. |
| 8,489,163 B2 | 7/2013 | Herr et al. |
| 8,571,614 B1 | 10/2013 | Mukhanov et al. |
| 8,654,578 B2 | 2/2014 | Lewis et al. |
| 9,543,959 B1 | 1/2017 | Carmean |
| 9,812,192 B1 | 11/2017 | Burnett et al. |
| 10,158,363 B1 | 12/2018 | Braun |
| 2003/0011398 A1 | 1/2003 | Herr |
| 2003/0016069 A1 | 1/2003 | Furuta et al. |
| 2003/0055513 A1 | 3/2003 | Raussendorf et al. |
| 2004/0022332 A1 | 2/2004 | Gupta et al. |
| 2006/0290553 A1 | 12/2006 | Furuta et al. |
| 2007/0077906 A1 | 4/2007 | Kirichenko et al. |
| 2008/0186064 A1 | 8/2008 | Kirichenko |
| 2008/0231353 A1 | 9/2008 | Filippov et al. |
| 2009/0002014 A1 | 1/2009 | Gupta et al. |
| 2009/0153381 A1 | 6/2009 | Kirichenko |
| 2009/0289638 A1 | 11/2009 | Farinelli et al. |
| 2009/0319757 A1 | 12/2009 | Berkley |
| 2009/0322374 A1* | 12/2009 | Przybysz ............... B82Y 10/00 326/5 |
| 2010/0033206 A1 | 2/2010 | Herr et al. |
| 2011/0267878 A1 | 11/2011 | Herr et al. |
| 2012/0184445 A1 | 7/2012 | Mukhanov et al. |
| 2013/0040818 A1 | 2/2013 | Herr et al. |
| 2014/0118024 A1 | 5/2014 | Eastin |
| 2014/0223224 A1 | 8/2014 | Berkley |
| 2014/0314419 A1* | 10/2014 | Paik ...................... H04B 10/70 398/115 |
| 2015/0094207 A1 | 4/2015 | Herr et al. |
| 2015/0254571 A1 | 9/2015 | Miller et al. |
| 2016/0034609 A1 | 2/2016 | Herr et al. |
| 2016/0125102 A1 | 5/2016 | Shauck et al. |
| 2019/0149139 A1 | 5/2019 | Braun |

FOREIGN PATENT DOCUMENTS

| | | |
|---|---|---|
| JP | S58135141 A | 8/1983 |
| JP | S60163487 A | 8/1985 |
| JP | H08148989 A | 6/1996 |
| JP | 2006165812 A | 6/2006 |
| JP | 2006165812 A1 | 6/2006 |
| JP | 2012064622 A | 3/2012 |
| JP | 2013529380 A | 7/2013 |
| WO | 2008089067 | 7/2008 |
| WO | 2012174366 A1 | 12/2012 |
| WO | 2013025617 A1 | 2/2013 |
| WO | 2014028302 A2 | 2/2014 |
| WO | 2016007136 A1 | 1/2016 |
| WO | 2018075106 A1 | 4/2018 |

OTHER PUBLICATIONS

Rabi frequency https://en.wikipedia.org/wiki/Rabi_frequency (Year: NA).*
Herr et al., "Systems and Methods for Applying Flux to a Quantum-Coherent Superconducting Circuit", filed Aug. 14, 2012, U.S. Appl. No. 13/585,467, pp. 1-22.
Naaman et al., "Hybrid Quantum Circuit Assembly", filed May 29, 2014, U.S. Appl. No. 14/290,457, pp. 1-22.
Naaman et al., "Josephson Current Source Systems and Method", filed Dec. 9, 2014, U.S. Appl. No. 14/564,962, pp. 1-43.
Castellano et al., "Deep-Well Ultrafast Manipulation of a SQUID Flux Qubit", New Journal of Physics, 12, Apr. 28, 2010, pp. 1-13.
Chiarello, "Tunable Flux Qubit Manipulated by Fast Pulses: Operating Requirements, Dissipation and Decoherence", arXiv preprint cond-mat/0602464, 2006, pp. 1-6.
Zhou et al., "A Tipping Pulse Scheme for a rf-SQUID Qubit", Applied Superconductivity, IEEE Transactions on 11.1 (2001), pp. 1018-1021.
International Search Report for corresponding PCT/US2016/016625; dated May 12, 2016.
Li et al 1: "Dynamical Autler-Townes control of a phase qubit", SCI ENTI FI C Reports, vol. 2, Dec. 11, 2012 (Dec. 11, 2012), XP055268241, DOI: 10.1038/srep00645 p. 1-p. 6, right-hand column, paragraph 2.
Jerger et al: "Frequency division multiplexing readout and simultaneous manipulation of an array of flux qubits", Applied Physics Letters, A I P Publishing LLC, US, vol. 101, No. 4,Jul. 23, 2012 (Jul. 23, 2012) , pp. 42604-42604, XP012164086, ISSN: 0003-6951, 001: 10.1063/1.4739454 [retrieved on Jul. 27, 2012] pp. 042604-1-042604-3.
Li et al 2: "Operation of a phase qubit as a quantum switch", arxiv.org, Cornell University Library, 201 Olin Library Cornell University Ithaca, NY 14853, Mar. 14, 2011 (Mar. 14, 2011), XP080543914, 001: 10.1038/SREP00645 p. 1-p. 3, right-hand column, paragraph 3.
DiCarlo L et al: "Demonstration of Two-Qubit Algorithms with a Superconducting Quantum Processor", arxiv.org, Cornell University Library, 201 Olin Library Cornell University Ithaca, NY 14853, Mar. 11, 2009 (Mar. 11, 2009), XP080314862, 001: 10.1038/NATURE08121 the whole document.
A. Laucht et al: "Electrically controlling single-spin qubits in a continuous microwave field", Science, vol. I, No. 3, Apr. 10, 2015 (Apr. 10, 2015), pp. e1500022-e1500022, XP055267170, US ISSN: 0036-8075, 001: 10.1126/sciadv.1500022 the whole document.
Australian Examination Report corresponding to Australian Patent Application No. 2016215234, dated Apr. 17, 2018.
International Written Opinion and Search Report corresponding to International Application No. PCT/US2018/056310 dated Jan. 22, 2019.
International Written Opinion and Search Report corresponding to International Application No. PCT/US2018/056316 dated Jan. 25, 2019.
International Written Opinion and Search Report corresponding to International Application No. US/PCT2018/056305 dated Jan. 30, 2019.
Narendran, S. et al.: "Quantum computation based on Reciprocal Quantum logic", 2017 International Conference on Nextgen Electronic Technologies; Silicon to Software (ICNETS2), IEEE, Mar. 23, 2017 (Mar. 23, 2017), pp. 34-37. Retrieved on Oct. 13, 2017. p. 25, right hand column, paragraph 1; figures 6,7.
Likharev, K.K. et al.: "RSFQ Logic/Memory Family: A New Josephson-Junction Technology for Sub-Terahertz-Clock-Frequency Digital Systems," IEEE Transactions on Applied Superconductivity, vol. 1 No. 1, Mar. 1991.
Kotani S. et al.: "Ultrahigh-speed logic gate family with Nb/Al-A10 x / Nb Josephson junctions", IEEE Transactions on Election Devices, vol. 33, No. 3, Mar. 1, 1986 (Mar. 1, 1986), pp. 379-384.
European Examination Report corresponding to European Patent Application No. 14 830 748.1 dated Mar. 15, 2019.
Rylyakov, A.: http://www.physics.sunysb.edu/Physics/RSFQ/Lib/AR/dff.html.
Korean Office Action Corresponding to KR Application No. 10-2017-7021776 dated Mar. 18, 2019.
International Search Report for International Application No. PCT/US2018056293 dated Apr. 2, 2019.
Examination Report for Australian Patent Application No. 2018229427 dated Jun. 5, 2019, May 8, 2019.
International Search Report for PCT/US2019/015233 dated Apr. 25, 2019.
Maezawa M et al: "Pulse-driven dual-rail logic gate family based on rapid single-flux-quantum (RSFQ) devices for asynchronous circuits", Advanced Research in Asynchronous Circuits and Systems, 1996. Proceedings., Second International Symposium on Fukushima, Japan 18-21 Mar. 1, Los Alamitos, CA, USA, IEE Comput. Soc, US, Mar. 18, 1996, pp. 134-142, XP010159627, DIO:10.1109/SYNC. 1996.494445 ISBN: 978-0-8186-7298-9 the whole document.
International Search Report for PCT/US2019/015228 dated Apr. 25, 2019.

(56) References Cited

OTHER PUBLICATIONS

Examination Report for Australian Application No. 2017237713 dated Apr. 26, 2019.
Non Final Office Action for U.S. Appl. No. 16/051,058 dated Jun. 3, 2019.
Canadian Office Action for Application No. 3,017,392 dated Jul. 23, 2019.
Non Final Office Action for U.S. Appl. No. 16/051,102 dated Sep. 11, 2019.
Grajcar et al, "Direct Josephson coupling between superconducting flux qubits", arxiv.org, Cornell University Library, 201 Olin Library Cornell University Ithaca, NY 14853, Jan. 5, 2005, XP080187009, DOI: 10.1103/PHYSERVB.72.020503, figure 5.
International Search Report for PCT/US2019/014803 dated Jun. 6, 2019.
International Search Report for PCT/US2019/015229 dated Jun. 18, 2019.
Bacon et al., "Adiabatic Gate Teleportation", arxiv.org, Cornell University Library, 201 Olin Library Cornell University Ithaca, Ny 14853 (May 6, 2009), doi: 10.1103/PHYSERVLETT.103.120504, Claims 1-20.
Australian Examination Report for Application No. 2017345039 dated Jul. 8, 2019.
European Office Action for Application No. 17 706 655.2-1203 dated Jul. 3, 2019.
Jian Li, et al., "Dynamical Autler-Townes control of a phase qubit", Scientific Reports, vol. 2, Dec. 11, 2012, XP055268241, DOI: 10.1038/srep00654 p. 1-p. 6, right-hand column, paragraph 2.
Jerger M, et al., "Frequecy division multiplexing readout and simultaneous manipulation of an array of flux quibts", Applied Physics Letters, AIP Publicsing LLC, US, vol. 101, No. 4, Jul. 23, 2012, pp. 42604-42604, XP012164086, ISSN: 0003-6951, DOI: 10.1063/1.4739454 [retrieved on Jul. 27, 2012] pp. 042604-1-042604-3.
Jian Le, et al, "Operation of a phase qubit as a quantum switch", arxiv.org, Cornell University Library, 201 Olin Library Cornell University Ithaca, NY 14853, Mar. 14, 2011, SP080543914, DOI: 10.1038/SREP00645 p. 1-p. 3, right-hand column, paragraph 3.
DiCarlo L, et al., "Demonstration of Two-Qubit Algorithms with a Superconducting Quantum Porcessor", arxiv.org, Cornell University Library, 201 Olin Library Cornell University Ithaca, NY 14853, Mar. 11, 2009, XP080314862, DOI: 10.1038/NATURE08121 the whole document.
A. Laucht, et al., "electrically controlling single-spin qubits in a continuous microwave field", Science, vol. 1, No. 3 Apr. 10, 2015, pp. e150002-e1500022, XP055267170, US ISSN: 0036-8075, DOI: 10.14126/sciadv.1500022 the whole document.
Japanese Office Action for Application No. 2018-549958 dated Oct. 8, 2019.
Australian Examination Report for Application No. 2017345039 dated Oct. 9, 2019.
International Search Report for International Application No. PCT/US2019/040372 dated Dec. 5, 2019.
European Search Report for Application No. EP 19 18 7630 dated Oct. 4, 2019.
Invitation to Pay Additional Fees for Application No. PCT/US2019/040297 dated Nov. 15, 2019.
Japanese Office Action for Application No. 2018-187270 dated Dec. 10, 2019.
Canadian Office Action for Application No. 3034016 dated Dec. 18, 2019.
Nowka, "High-Performance CMOS system Design Using Wave Pipelining", Sernatantic Scholar, https://www.semanticscolar.org/paper/High-Performance-CMOS-System-Design-Using-Wave-Nowka/a5ef4cd1e69cae058f162a9a8bf085b027d35f0c, Jan. 31, 1996 (Jan. 31, 1996).
Final Office Action for U.S. Appl. No. 14/616,473 dated Dec. 26, 2019.
The formula for the dot product in terms of vector components https://mathinsight.org/dot_product_formula_components (Year: Na)
Rab; frequency https://en.wikipedia.org/wiki/Rabi_frequency (Year: NA).
European Office Action for Application No. 17 847 738.6 dated Jan. 16, 2020.
Richard H Warren: "Gates for Adiabatic Quantum Computing", Aug. 26, 2014 (Aug. 26, 2014), XP055438870.
Australian Examination Report for Application No. 2017321014 dated Jan. 28, 2020.

\* cited by examiner

FLUX CONTROL OF QUBIT UNDER RESONANT EXCITATION

FLUX CONTROL OF QUBIT UNDER RESONANT EXCITATION

This invention was made with Government support under Contract No. SAP PO 30059298. The Government has certain rights in this invention.

TECHNICAL FIELD

The invention relates generally to quantum computing, and more specifically, to flux control of qubit under resonant excitation.

BACKGROUND

Quantum information processing requires large numbers and high densities of qubits to implement quantum algorithms, and even greater amounts of classical control and readout hardware to operate the qubits. In the field of superconducting qubits, there is a need for high density, cryogenic hardware capable of the control and readout of qubits. The qubit with the current record for coherence times and process fidelities, the transmon, is currently controlled with bulky room temperature microwave equipment.

SUMMARY

In one example, a system is provided for flux control of a qubit. A quantum system includes a microwave transmitter configured to provide a continuous microwave tone, and a qubit configured such that a portion of an energy spectrum of the qubit is responsive to an applied flux. The qubit also has an inductive element responsive to the continuous microwave tone to produce a Rabi oscillation within the qubit. A flux source is configured to apply a flux to the qubit.

In another example, a method is provided for performing an X rotation of a qubit. The qubit is configured such that the qubit is responsive to the continuous microwave tone to produce a Rabi oscillation within the qubit and a portion of an energy spectrum of the qubit is responsive to an applied flux. A continuous microwave tone is provided to the qubit. A flux pulse is provided to the qubit as to tune the energy spectrum of the qubit to a frequency of the Rabi oscillation for a predetermined time. The flux pulse is adjusted to detune the energy spectrum of the qubit from the frequency of the Rabi oscillation after the predetermined time.

In yet another example, a method is provided for performing a Y rotation of a qubit. The qubit is configured such that the qubit is responsive to the continuous microwave tone to produce a Rabi oscillation within the qubit and a portion of an energy spectrum of the qubit is responsive to an applied flux. A continuous microwave tone is provided to the qubit. A flux pulse is provided to the qubit as to detune the energy spectrum of the qubit from a frequency of the Rabi oscillation by a first predetermined amount for a predetermined time. The flux pulse to the qubit is adjusted as to detune the energy spectrum of the qubit from a frequency of the Rabi oscillation by a second predetermined amount for the predetermined time. The second predetermined amount is the additive inverse of the first predetermined amount.

BRIEF DESCRIPTION OF THE DRAWINGS

The features, objects, and advantages of the invention will become more apparent from the detailed description set forth below when taken in conjunction with the drawings, wherein.

DETAILED DESCRIPTION OF THE INVENTION

In general, phase and amplitude modulated burst of microwaves have been used to control transmon qubits. These systems require two high sample rate arbitrary waveform channels and a series of bulky room temperature microwave components per qubit. The proposed system and methods allows for the control of a superconducting qubit using a single waveform channel capable of making a square wave pulse, rather than the traditional shaped microwave burst. This control method is compatible with Single Flux Quantum (SFQ) systems, which can generate the control signals on chip at cryogenic temperatures, improving the scalability of the qubit control hardware. Accordingly, the system can eliminate the need for room temperature signal generation or sophisticated microwave techniques through the use of continuous resonant microwave excitations and quasi-static flux pulses to achieve orthogonal, universal control of a single qubit precise control of a superconducting qubit with a Single Flux Quantum (SFQ) style flux.

Figure 1:
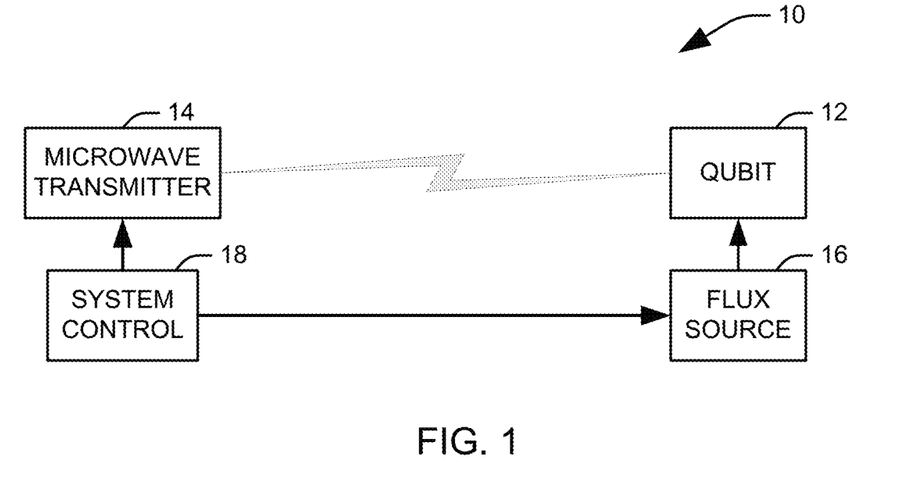
FIG. 1 illustrates a quantum system for controlling a state of at least one qubit.

FIG. 1 illustrates a quantum system 10 for controlling a state of at least one qubit 12. In the illustrated system 10, the qubit 12 is configured such that a portion of an energy spectrum of the qubit is responsive to an applied flux. Specifically, at least a portion of the energy spectrum of the qubit must be linearly dependent on an applied flux. Examples of such qubits include flux qubits and transmon qubits. Further, the qubit 12 includes an inductive element (not shown) responsive to a continuous microwave tone to produce a coherent Rabi oscillation within the qubit. To this end, the system 10 further includes a microwave transmitter 14 configured to provide a continuous microwave tone to the qubit. When the microwave transmitter 14 is active, a Rabi oscillation having a known frequency is induced within the qubit. It will be appreciated that the microwave transmitter 14 can be located outside of a cryogenic portion of the system 10, and is capable of broadcasting to multiple qubits.

The illustrated system 10 allows the qubit 12 to be controlled using flux pulses instead of shaped microwave bursts. Accordingly, the system 10 includes a flux source 16 controlled by a system control 18 as to selectively apply flux to the qubit, such that a qubit resonance frequency associated with the energy spectrum of the qubit can be selectively tuned to a frequency of the Rabi oscillation. In one implementation, one or both of the flux source 16 and the system control 18 are implemented as a single flux quantum (SFQ) logic circuit. In general, the flux source 16 tunes a transition energy, and thus an accompanying characteristic frequency, between a ground state of the qubit 12 and a first excited state. Accordingly, this transition can be tuned relative to the Rabi frequency, as to rotate the state of qubit along one of two orthogonal axes. In practice, the flux source 16 can be located within the cryogenic portion of the system with the qubit, with the system control 18 located outside of this region. It will be appreciated that the system control 18 can be implemented as software executed by a general-purpose processor, dedicated hardware, or a mix of software and dedicated hardware.

In the rotating frame, the single qubit Hamiltonian can be written as $H_{rf} = \hbar\Omega\sigma_x + \hbar\Delta\sigma_z$, where $\hbar$ is the reduced Plank's constant, $\Omega$ is the Rabi oscillation frequency from a continuous wave drive tone, and $\Delta$ is the frequency detuning between the qubit resonance and the drive tone. In one example, using a split junction Transmon qubit, the qubit resonance frequency is controlled by the application of a flux to a junction loop of the qubit. Changes to the qubit resonance frequency adjust the detuning to the constant microwave tone, thereby adjusting $\Delta$. This differs significantly from traditional microwave control, with the continuous wave nature of the microwave tone, in contrast to existing shaped microwave pulse approaches allows the microwave tone to be applied to many qubits simultaneously. The individual qubits can be controlled using compact, cryogenic circuitry, such as single flux quantum circuits.

The presence of the always on tone results in a population of the second excited state due to off resonant excitation of the two photon transition between ground and the second excited state and the single photon transition between the first and second excited states. Unlike existing microwave burst control, there is no resonant excitation due to Fourier side peaks on the microwave burst; since the tone here is continuous, its spectrum is free of spurs. A steady state population of the second excited states state depends on the Rabi oscillation frequency, the amplitude of the microwave tone, and an anharmonicity of the qubit states. The population is, for a given frequency and anharmonicity, directly proportional to the signal amplitude, and is lower for lower Rabi oscillation frequencies. The leakage is dramatically reduced with increases in the anharmonicity.

In one implementation, the system control 18 is configured to tune the qubit 12 resonance frequency to the frequency of the Rabi oscillation for a predetermined period of time. When the transition frequency of the qubit 12 is tuned to the frequency of the Rabi oscillation, the qubit rotates around an X-axis of the Bloch sphere, changing the state of the qubit. The time for which the qubit is in tune to the Rabi frequency can be predetermined according to a desired angle of the rotation, such that a controlled X rotation of the qubit state is achieved. Specifically, this predetermined time is equal to a ratio of a desired angle of the X rotation to the frequency of the Rabi oscillation.

In another implementation, the system control 18 is configured to tune the transition frequency of the qubit 12 such that the qubit is selectively detuned. Specifically, the detuning is pulsed symmetrically around a zero point, such that the qubit resonant frequency is detuned from the frequency of the Rabi oscillation by a first amount for a predetermined period of time and then detuned from the frequency of the Rabi oscillation by a second amount for the predetermined period of time, with the second amount is the additive inverse of the first amount. This results in a rotation around the Y-axis of the Bloch sphere, with the amount of the Y rotation being controlled by the length of the pulse and the amount of the deflection. In one implementation, the predetermined time can be determined as $$\frac{\phi\cos\left(\frac{\phi}{4}\right)}{\Omega},$$

where $\phi$ is a desired angle of the Y rotation, and $\Omega$ is the frequency of the Rabi oscillation, and the magnitude of the detuning can be selected as $$\Omega\tan\left(\frac{\phi}{4}\right).$$

In still another implementation, the system control is configured to tune the qubit resonance frequency such that the detuning is pulsed symmetrically around a zero point with a delay, such that the qubit resonant frequency is detuned from the frequency of the Rabi oscillation by a first amount for a first predetermined period of time, tuned to the frequency of the Rabi oscillation for a second predetermined period of time, and then detuned from the frequency of the Rabi oscillation by a second amount for the first predetermined period of time, where the second amount is the additive inverse of the first amount. In one example, the times for which the qubit is detuned is equal to $$\frac{\phi\cos\left(\frac{\phi}{2}\right)}{\Omega},$$

where $\phi$ is a desired angle of the Y rotation, and $\Omega$ is the frequency of the Rabi oscillation, the magnitude of the detuning is equal to $$\Omega\tan\left(\frac{\phi}{2}\right),$$

and the time for which the qubit is tuned to the Rabi frequency is equal to $$\frac{\pi}{\Omega}.$$

Figure 2:
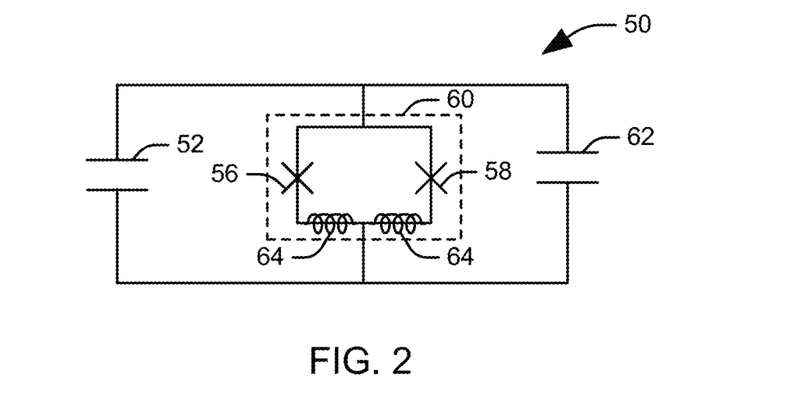
FIG. 2 illustrates one example of a qubit assembly that could be used in the quantum system of FIG. 1, specifically a split junction transmon qubit assembly.

FIG. 2 illustrates one example of a qubit assembly 50 that could be used in the quantum system of FIG. 1, specifically a split junction transmon qubit assembly. It will be appreciated, however, that this is not an exclusive example, and that any qubit with at least a portion of its energy spectrum that is responsive to a received flux could be used including at least transmon qubits of other configurations, flux qubits, and phase qubits. The illustrated tunable transmon assembly 50 includes a first capacitor 52, having a capacitance, C, on a first path between a transmission line and a circuit ground. Second and third Josephson junctions 56 and 58 are arranged in parallel with one another on a second path between a transmission line and a circuit ground to form a direct current superconducting quantum interference device (DC SQUID) 60, each having a inductance $\alpha I_c$, where $\alpha$ is a number between zero and one referred to herein as an asymmetry of the qubit assembly 50. The DC SQUID is arranged in parallel with the first capacitor 52. A second capacitor 62 is arranged in parallel with the first Josephson junction and the DC SQUID on a third path between a transmission line and a circuit ground.

The tunable transmon qubit assembly 50 includes an inductive element 64 that receives flux pulses to tune the energy spectrum of the qubit. In the illustrated implementation, the flux pulse is provided to the DC SQUID 60, but one of skill in the art will appreciate that the pulses could be applied to the qubit assembly 50 in a similar fashion.

Figure 3:
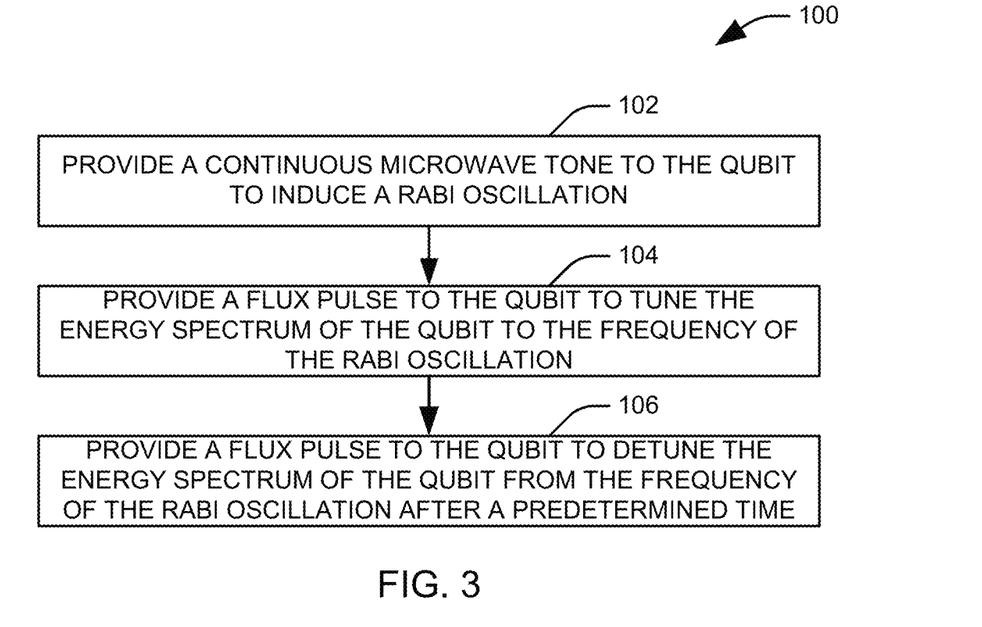
FIG. 3 illustrates a method for performing an X rotation of a qubit.
Figure 4:
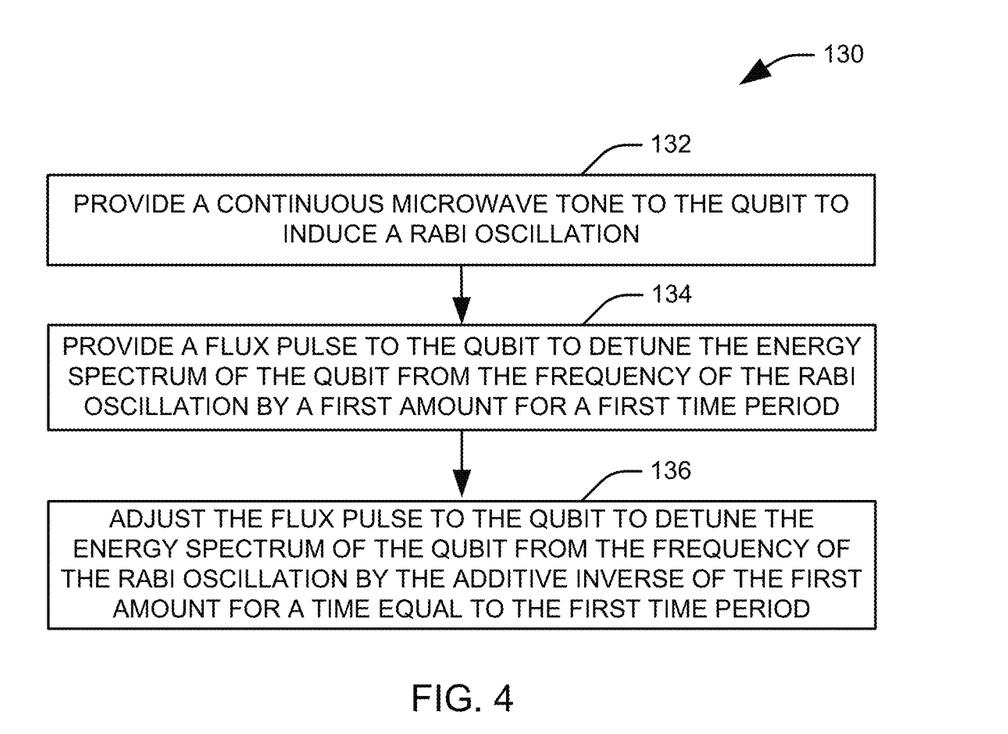
FIG. 4 illustrates a first method for performing a Y rotation of a qubit.
Figure 5:
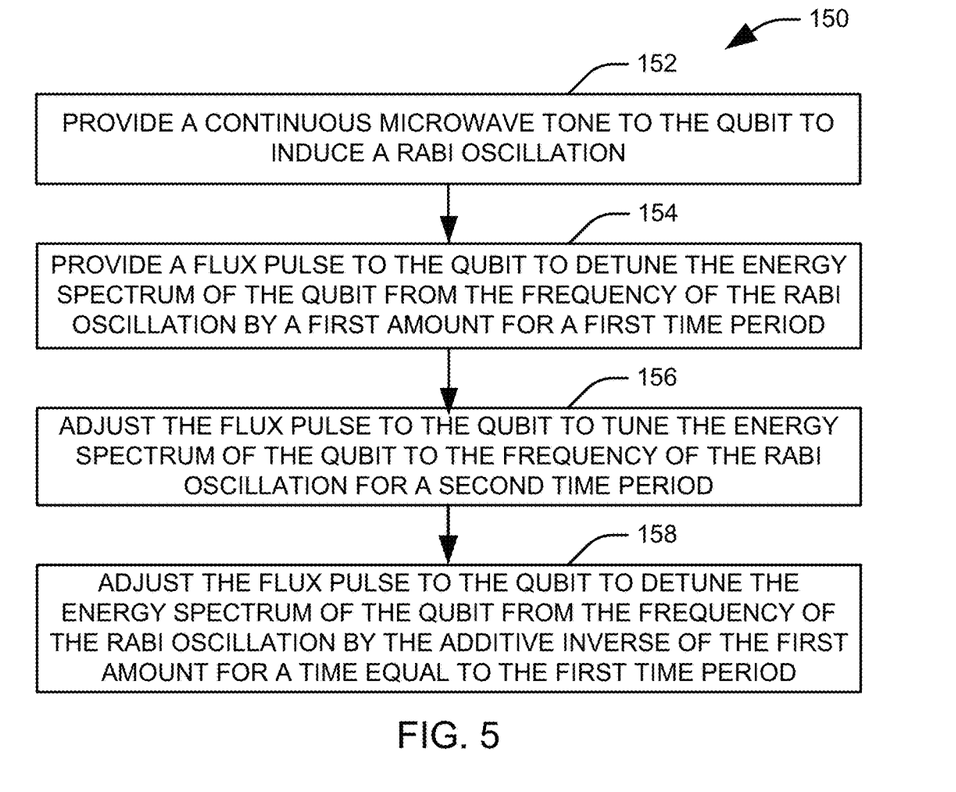
FIG. 5 illustrates a second method for performing a Y rotation of a qubit.

In view of the foregoing structural and functional features described above, methods in accordance with various aspects of the present invention will be better appreciated with reference to FIGS. 3-5. While, for purposes of simplicity of explanation, the methods of FIGS. 3-5 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a method in accordance with an aspect of the present invention.

FIG. 3 illustrates a method 100 for performing an X rotation of a qubit. In the illustrated method 100, the qubit is configured to be responsive to the continuous microwave tone to produce a Rabi oscillation within the qubit. Further, a portion of an energy spectrum of the qubit is responsive to an applied flux. At 102, a continuous microwave tone is provided to the qubit to induce the Rabi oscillation in the qubit. At 104, a flux pulse is provided to the qubit as to tune the energy spectrum of the qubit to a frequency of the Rabi oscillation for a predetermined time. For example, a ground-to-first excited state transition frequency of the qubit can be tuned to the frequency of the Rabi oscillation. At 106, the flux pulse is adjusted to detune the energy spectrum of the qubit from the frequency of the Rabi oscillation after the predetermined time. In one implementation, the predetermined time is equal to a ratio of a desired angle of the X rotation to the frequency of the Rabi oscillation.

FIG. 4 illustrates a first method 130 for performing a Y rotation of a qubit. In the illustrated method 130, the qubit is configured to be responsive to the continuous microwave tone to produce a Rabi oscillation within the qubit. Further, a portion of an energy spectrum of the qubit is responsive to an applied flux. The method utilizes a symmetrical detuning, with a first flux pulse providing a first detuning followed immediately by a second flux pulse providing a detuning equal in magnitude and duration but opposite in direction. At 132, a continuous microwave tone is provided to the qubit. At 134, a flux pulse is provided to the qubit as to detune the energy spectrum of the qubit from a frequency of the Rabi oscillation by a first predetermined amount for a predetermined time. For example, a ground-to-first excited state transition frequency of the qubit can be detuned from the frequency of the Rabi oscillation by the predetermined amount, equal to $$\Omega\tan\left(\frac{\phi}{4}\right),$$

for a time equal to $$\frac{\phi\cos\left(\frac{\phi}{4}\right)}{\Omega},$$

where $\phi$ is a desired angle of the Y rotation, and $\Omega$ is the frequency of the Rabi oscillation. At 136, the flux pulse to the qubit is adjusted as to detune the energy spectrum of the qubit from a frequency of the Rabi oscillation by a second predetermined amount equal to the additive inverse of the first predetermined amount, for the same time period. Accordingly, in the example given previously, the energy spectrum would be detuned from the Rabi oscillation by an amount $$-\Omega\tan\left(\frac{\phi}{4}\right)$$

for a time equal to $$\frac{\phi\cos\left(\frac{\phi}{4}\right)}{\Omega}.$$

FIG. 5 illustrates a second method 150 for performing a Y rotation of a qubit. In the illustrated method 150, the qubit is configured to be responsive to the continuous microwave tone to produce a Rabi oscillation within the qubit. Further, a portion of an energy spectrum of the qubit is responsive to an applied flux. The method utilizes a modified symmetrical detuning, with a first flux pulse providing a first detuning followed after a delay, during which the spectrum is tuned to the Rabi frequency, by a second flux pulse providing a detuning equal in magnitude and duration but opposite in direction. At 152, a continuous microwave tone is provided to the qubit. At 154, a flux pulse is provided to the qubit as to detune the energy spectrum of the qubit from a frequency of the Rabi oscillation by a first predetermined amount for a first predetermined time. For example, a ground-to-first excited state transition frequency of the qubit can be detuned from the frequency of the Rabi oscillation by the predetermined amount, equal to $$\Omega\tan\left(\frac{\phi}{2}\right),$$

for a time equal to $$\frac{\phi\cos\left(\frac{\phi}{2}\right)}{\Omega},$$

where $\phi$ is a desired angle of the Y rotation, and $\Omega$ is the frequency of the Rabi oscillation.

At 156, the flux pulse to the qubit is adjusted as to tune the energy spectrum of the qubit to the frequency of the Rabi oscillation. The energy spectrum can be tuned to the Rabi frequency for a second predetermined time. In the example given previously, this second predetermined time can be equal to $$\frac{\pi}{\Omega}.$$

At 158, the flux pulse to the qubit is adjusted as to detune the energy spectrum of the qubit from a frequency of the Rabi oscillation by a second predetermined amount equal to the additive inverse of the first predetermined amount, for the same time period, that is, the first predetermined time. Accordingly, in the example given previously, the energy spectrum would be detuned from the Rabi oscillation by an amount $$-\Omega\tan\left(\frac{\phi}{2}\right)$$

for a time equal $$\frac{\phi\cos\left(\frac{\phi}{2}\right)}{\Omega}.$$

Compared to the method 130 shown in FIG. 4, this method 150 trades a factor of two in the rotation angle φ for a two-fold increase in detuning noise immunity.

Figure 6:
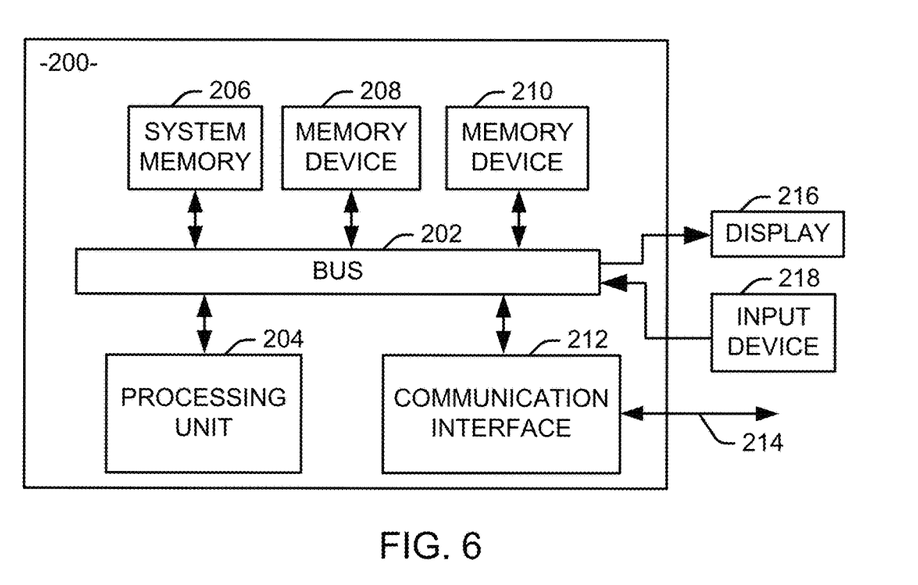
FIG. 6 illustrates a schematic block diagram illustrating an exemplary system of hardware components capable of implementing examples of the systems and methods disclosed in FIGS. 1-5.

FIG. 6 is a schematic block diagram illustrating an exemplary system 200 of hardware components capable of implementing examples of the systems and methods disclosed in FIGS. 1-5, such as the system control 18 of FIG. 1. The system 200 can include various systems and subsystems. The system 200 can be a personal computer, a laptop computer, a workstation, a computer system, an appliance, an application-specific integrated circuit (ASIC), a server, a server blade center, a server farm, etc.

The system 200 can includes a system bus 202, a processing unit 204, a system memory 206, memory devices 208 and 210, a communication interface 212 (e.g., a network interface), a communication link 214, a display 216 (e.g., a video screen), and an input device 218 (e.g., a keyboard and/or a mouse). The system bus 202 can be in communication with the processing unit 204 and the system memory 206. The additional memory devices 208 and 210, such as a hard disk drive, server, stand-alone database, or other non-volatile memory, can also be in communication with the system bus 202. The system bus 202 interconnects the processing unit 204, the memory devices 206-210, the communication interface 212, the display 216, and the input device 218. In some examples, the system bus 202 also interconnects an additional port (not shown), such as a universal serial bus (USB) port.

The processing unit 204 can be a computing device and can include an application-specific integrated circuit (ASIC). The processing unit 204 executes a set of instructions to implement the operations of examples disclosed herein. The processing unit can include a processing core.

The additional memory devices 206, 208 and 210 can store data, programs, instructions, database queries in text or compiled form, and any other information that can be needed to operate a computer. The memories 206, 208 and 210 can be implemented as computer-readable media (integrated or removable) such as a memory card, disk drive, compact disk (CD), or server accessible over a network. In certain examples, the memories 206, 208 and 210 can comprise text, images, video, and/or audio, portions of which can be available in formats comprehensible to human beings.

Additionally or alternatively, the system 200 can access an external data source or query source through the communication interface 212, which can communicate with the system bus 202 and the communication link 214.

In operation, the system 200 can be used to implement one or more parts of a system control for monitoring and controlling a quantum computing system. Computer executable logic for implementing the system control 126 resides on one or more of the system memory 206, and the memory devices 208, 210 in accordance with certain examples. The processing unit 204 executes one or more computer executable instructions originating from the system memory 206 and the memory devices 208 and 210. The term "computer readable medium" as used herein refers to a medium that participates in providing instructions to the processing unit 204 for execution, and can include either a single medium or multiple non-transitory media operatively connected to the processing unit 204.

The invention has been disclosed illustratively. Accordingly, the terminology employed throughout the disclosure should be read in an exemplary rather than a limiting manner. Although minor modifications of the invention will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

Having described the invention, I claim:

1. A method for performing a Y rotation of a qubit configured such that the qubit is responsive to the continuous microwave tone to produce a Rabi oscillation within the qubit and a portion of an energy spectrum of the qubit is responsive to an applied flux, the method comprising:
   providing a continuous microwave tone to the qubit;
   providing a flux pulse to the qubit as to detune the energy spectrum of the qubit from a frequency of the Rabi oscillation by a first predetermined amount for a predetermined time; and
   adjusting the flux pulse to the qubit as to detune the energy spectrum of the qubit from a frequency of the Rabi oscillation by a second predetermined amount for the predetermined time, wherein the second predetermined amount is the additive inverse of the first predetermined amount.

2. The method of claim 1, wherein the predetermined time is equal to $$\frac{\phi\cos\left(\frac{\phi}{4}\right)}{\Omega}$$

and the first amount is equal to $$\Omega\tan\left(\frac{\phi}{4}\right),$$

where φ is a desired angle of the Y rotation, and Ω is the frequency of the Rabi oscillation.

3. The method of claim 1, wherein the predetermined time is a first predetermined time and the method further comprises adjusting the flux pulse to the qubit as to tune the energy spectrum of the qubit to the frequency of the Rabi oscillation for a second predetermined time.

4. The method of claim 3, wherein the flux pulse is adjusted to the qubit as to tune the energy spectrum of the qubit to the frequency of the Rabi oscillation after the flux pulse is provided to the qubit and before the flux pulse is adjusted as to detune the energy spectrum of the qubit from a frequency of the Rabi oscillation by a second predetermined amount.

5. The method of claim 3, wherein the first predetermined time is equal to the first amount is equal to $$\frac{\phi\cos\left(\frac{\phi}{2}\right)}{\Omega},$$

$$\Omega\tan\left(\frac{\phi}{2}\right),$$

and the second predetermined time is equal to $$\frac{\pi}{\Omega},$$

where $\phi$ is a desired angle of the Y rotation, and $\Omega$ is the frequency of the Rabi oscillation.

6. A quantum system comprising:
a microwave transmitter configured to provide a continuous microwave tone;
a qubit configured such that a portion of an energy spectrum of the qubit is linearly dependent on an applied flux, the qubit having an inductive element responsive to the continuous microwave tone to produce a Rabi oscillation within the qubit;
a flux source configured to apply a flux to the qubit; and
a system control configured to control the flux source as to selectively apply flux to the qubit, such that a qubit resonance frequency associated with the energy spectrum of the qubit can be selectively tuned to a frequency of the Rabi oscillation, the system control being configured to tune the qubit resonance frequency such that the detuning is pulsed symmetrically around a zero point, such that the qubit resonant frequency is detuned from the frequency of the Rabi oscillation by a first amount for a predetermined period of time and then detuned from the frequency of the Rabi oscillation by a second amount for the predetermined period of time, where the second amount is the additive inverse of the first amount.

7. The quantum system of claim 6, wherein the system control is configured such that the predetermined time is equal to $$\frac{\phi\cos\left(\frac{\phi}{4}\right)}{\Omega},$$

where $\phi$ is a desired angle of the Y rotation, and $\Omega$ is the frequency of the Rabi oscillation.

8. The quantum system of claim 6, wherein the system control is configured such that the first amount is equal to $$\Omega\tan\left(\frac{\phi}{4}\right),$$

where $\phi$ is a desired angle of the Y rotation, and $\Omega$ is the frequency of the Rabi oscillation.

* * * * *